J. J. BYERS.
DRAFT RIGGING.
APPLICATION FILED JUNE 7, 1910.
1,069,385.
Patented Aug. 5, 1913.
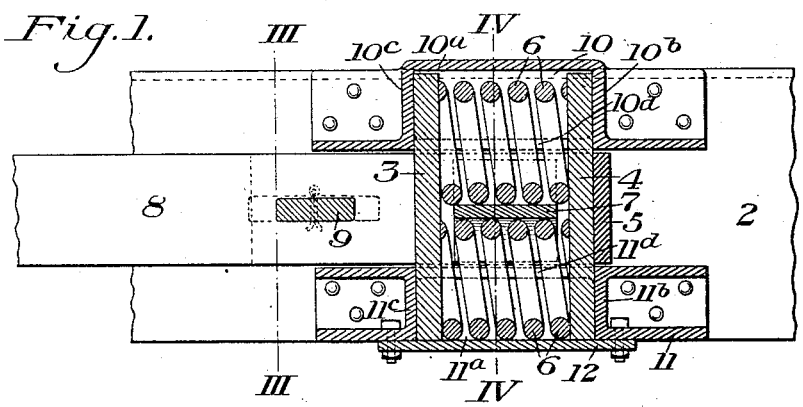
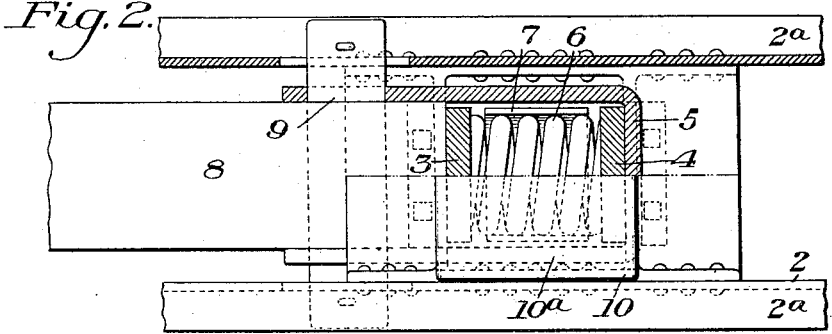
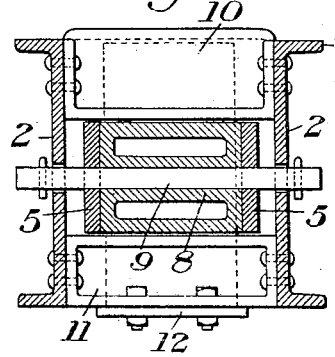
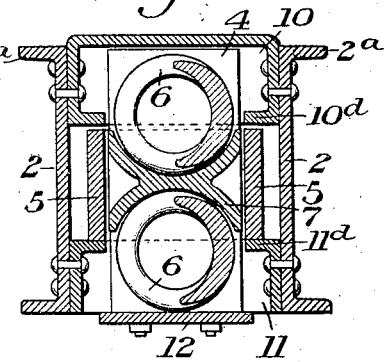
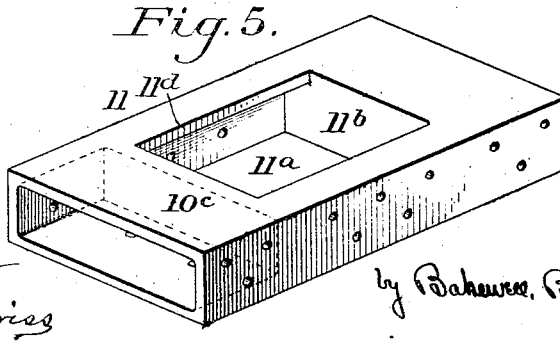
WITNESSES
R. A. Balderson
Walter Jamaris
INVENTOR
J. J. Byers,
by Bakewell, Byrnes & Parmelee,
his Attys.

UNITED STATES PATENT OFFICE.

JACOB J. BYERS, OF CHICAGO, ILLINOIS, ASSIGNOR TO THE NATIONAL MALLEABLE CASTINGS COMPANY, OF CLEVELAND, OHIO, A CORPORATION OF OHIO.

DRAFT-RIGGING.

1,069,385.  Specification of Letters Patent.  Patented Aug. 5, 1913.

Application filed June 7, 1910. Serial No. 565,577.

*To all whom it may concern:*

Be it known that I, JACOB J. BYERS, a citizen of the United States, and a resident of Chicago, Cook county, Illinois, have invented a new and useful Improvement in Draft-Riggings, of which the following is a full, clear, and exact description, reference being had to the accompanying drawings, forming part of this specification, in which—

Figure 1 is a longitudinal section, partly broken away, of a draft rigging embodying my invention; Fig. 2 is a view partially in plan and partially in horizontal section of the same; Figs. 3 and 4 are respectively sections on the lines III—III and IV—IV of Fig. 1; and Fig. 5 is a perspective view of one of the castings.

My invention has relation to draft riggings, and more particularly to draft riggings of the type described and claimed in my Patent No. 673,419 of May 7th, 1901, in which the draft springs are arranged one above the other, and are removable from below, the yoke embracing the springs laterally instead of vertically.

My present invention is designed to provide means of simple and efficient character for connecting the draft rigging to the draft sills, and for providing a pocket to contain the draft rigging.

Referring to the drawings, the numeral 2 designates the draft sills, which are shown as consisting of spaced channels, having their flanges 2ª turned outwardly. 3 is the front follower, 4 the rear follower, 5 the yoke, and 6 the draft springs arranged one above another between the followers 3 and 4 and having an interposed separator 7. 8 is the drawbar, which is connected to the yoke at 9 in any suitable or usual manner.

In accordance with my invention, I secure between the draft sills 2, upper and lower members, or castings 10 and 11. These castings are shown as being of general box form, securely riveted to the draft sills at their side portions. The upper casting or member 10 has the upwardly projecting central portion 10ª closed at the top and provides at its opposite ends the bearing wall 10ᵇ and 10ᶜ for the followers 3 and 4 respectively, and is also provided with an inward projection or rib 10ᵈ on each side to guide the followers and the yoke. The lower member or casting has an open central portion 11ª with end walls 11ᵇ and 11ᶜ, which form bearings for the lower end portions of the followers 3 and 4, and it is also provided with an inward projection or rib 11ᵈ on each side to guide the followers and yoke. The open portion 11ª is normally closed by a removable plate 12. By the removal of this plate, the springs and followers can be readily dropped out of place when necessary.

My invention provides a draft rigging which can be very cheaply constructed; which provides effective means for engaging the draft rigging with the draft sills; and which provides a proper cage or pocket for the draft springs and followers, and into and from which the springs and followers can be readily inserted and removed.

I do not limit myself to the precise construction and arrangement of the parts which I have herein shown and described, since it will be obvious that the members or castings 10 and 11 may be varied in form without departing from the spirit and scope of my invention, and that other changes may be made in the details of construction and arrangement of the parts within the scope of the appended claims.

What I claim is:—

1. A member for forming a portion of the pocket for draft riggings, having flat vertically disposed outer sides extending from end to end of the member, there being securing openings in said sides, said member having a flat horizontal guiding face at right angles to the outer sides and extending across the entire member, and vertical connecting webs between the ends of the member connected to the sides, the connecting webs extending from the top to the bottom of the member, there being a rectangular pocket in said member formed by a portion of the sides and the said connecting webs; substantially as described.

2. A pocket forming member for draft riggings, said member being of rectangular form with parallel vertical sides and flat outer faces, said member having a recess in each end and a central opening between the end recesses, said recesses and central opening being separated by vertical webs; substantially as described.

In testimony whereof, I have hereunto set my hand.

JACOB J. BYERS.

Witnesses:
TOM H. ROBINSON,
OTTO J. FEHLING.